United States Patent [19]

McCormack

[11] Patent Number: 5,025,661
[45] Date of Patent: Jun. 25, 1991

[54] COMBINATION AIR DATA PROBE

[75] Inventor: William H. McCormack, Tucson, Ariz.

[73] Assignee: Allied-Signal Inc., Morris Township, Morris County, N.J.

[21] Appl. No.: 448,790

[22] Filed: Dec. 11, 1989

[51] Int. Cl.$^5$ ............................................. G01C 21/00
[52] U.S. Cl. ...................................................... 73/180
[58] Field of Search ................................... 73/180, 182

[56] References Cited

U.S. PATENT DOCUMENTS

| | | |
|---|---|---|
| 1,869,962 | 8/1932 | Golden . |
| 2,660,056 | 11/1953 | Schuck et al. . |
| 2,725,746 | 12/1955 | Young . |
| 2,876,640 | 3/1959 | Beach, Jr. et al. . |
| 2,923,152 | 2/1960 | Mabry, Jr. et al. . |
| 2,971,375 | 2/1961 | Fieldgate . |
| 3,029,639 | 4/1962 | Groesbeck . |
| 3,043,142 | 7/1962 | Eiland, Jr. et al. . |
| 3,079,758 | 3/1963 | Vogel et al. . |
| 3,120,123 | 2/1964 | Werner et al. . |
| 3,228,247 | 1/1966 | Hansen et al. . |
| 3,244,001 | 4/1966 | Pettingall . |
| 3,318,146 | 5/1967 | De Leo et al. . |
| 3,585,859 | 6/1971 | De Leo . |
| 3,673,866 | 7/1972 | Alperovich . |
| 3,914,997 | 10/1975 | Pinckney . |
| 4,096,744 | 6/1978 | De Leo et al. . |
| 4,182,188 | 1/1980 | Britton et al. . |
| 4,230,290 | 10/1980 | Townsend et al. . |
| 4,378,696 | 4/1983 | DeLeo et al. . |
| 4,378,697 | 4/1983 | De Leo et al. . |
| 4,718,273 | 1/1988 | McCormack . |

FOREIGN PATENT DOCUMENTS 692496 6/1940 Fed. Rep. of Germany .
908572 9/1960 United Kingdom .

OTHER PUBLICATIONS

"Calibration of the Orbiter Air Data System for Space Shuttle Orbital Flight Testing", David E. Tymms and Ernest R. Hillje, 1980 Air Data Systems Conference, USAF Academy.

Primary Examiner—Robert Raevis
Attorney, Agent, or Firm—Henry M. Bissell; James W. McFarland; Robert A. Walsh

[57] ABSTRACT

A combination air data probe performs a number of different pressure measurements from a single structure. Measurements of total pressure and total temperature are performed in an improved structural configuration which renders these measurements substantially insensitive to aircraft angle of attack. Static temperature is computed free of recovery factor error because of compensatory effects in the pressure and temperature signals. Another part of the probe provides measurement of static pressure and pressures for determining angle of attack.

17 Claims, 3 Drawing Sheets

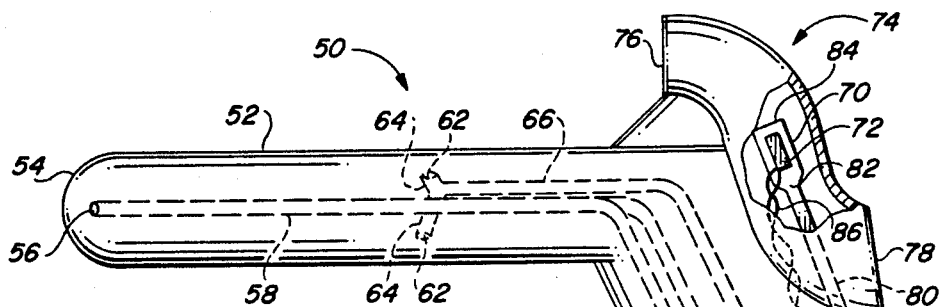
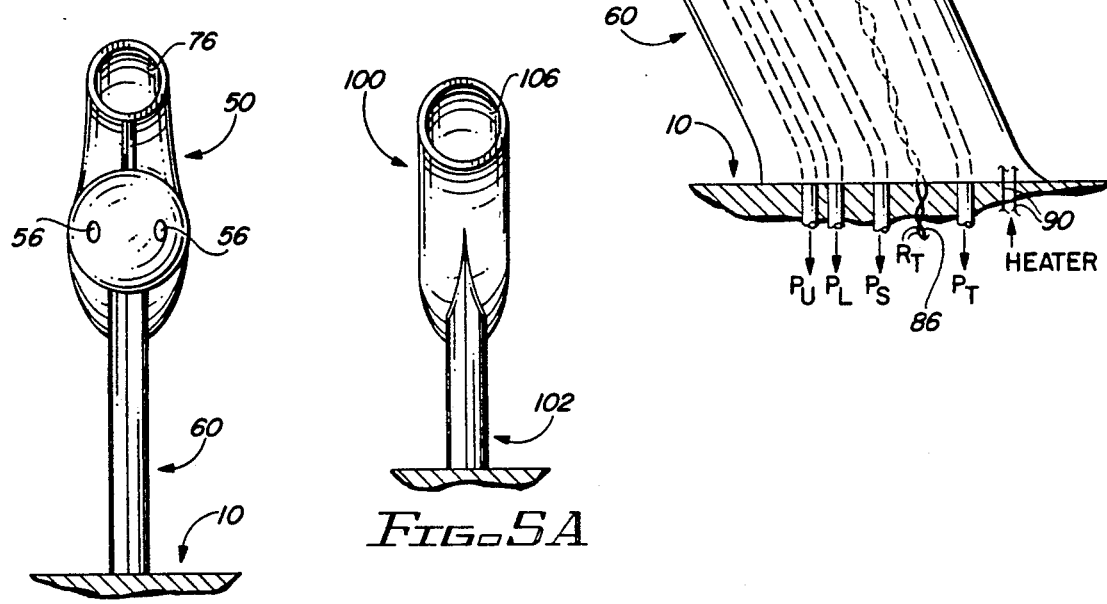
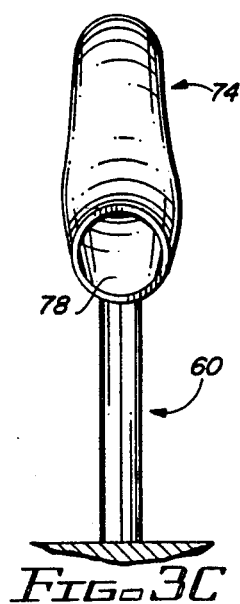
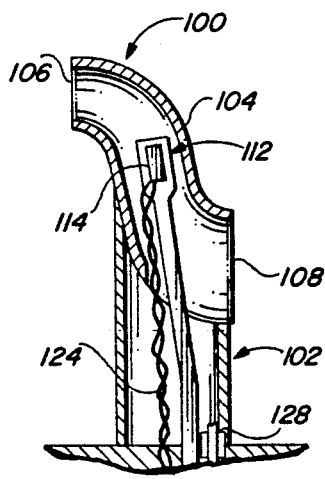
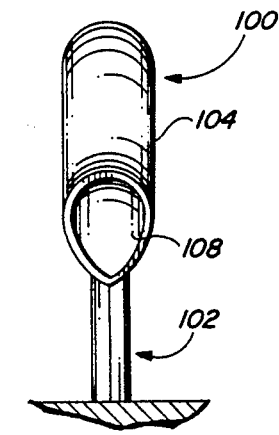

COMBINATION AIR DATA PROBE

BACKGROUND OF THE INvENTION

1. Field of the Invention

This invention relates to aircraft instrumentation and, more particularly, to devices extending into the air stream for sensing parameters which are used to develop derived air data for instrument readout.

2. Description of the Related Art

It has long been customary to use probes which project from or are mounted to the external surfaces of an aircraft to make various air data measurements which are useful in providing certain instrument displays to a pilot. These probes have been of various types, ranging from the early Pitot tube to multi-aperture, multi-purpose probes mounted at various selected points on the aircraft. One particular probe which is used in certain trans-sonic and supersonic aircraft is disclosed in the De Leo et al Pat. No. 3,318,146. This is a generally cylindrical probe with a hemispherical forward surface and is designed to be mounted from the side of an aircraft. Other probes of a similar type may have a cylindrical body with a conical or ogival forward surface.

The De Leo et al probe contains a forward facing total pressure ($P_T$) port, located on the central axis of the probe, and four other ports distributed every 90° around the central axis with the axes of these ports being inclined at substantially 45° from the central axis. A first pair of these ports is located in a central vertical plane, the other pair being located in a central horizontal plane. In this probe, each of the ports is connected to its own separate conduit which leads to a corresponding sensor coupled to a computer in which appropriate scale factors can be supplied for developing desired output information. In straight and level flight, the pressure at the central axis port is total pressure, equal to the normal Pitot or stagnation pressure of the aircraft. The pressure measurement at the central port admittedly varies with aircraft attitude. In this particular instrument, the off axis ports are used to derive measurements of angle of attack ($\alpha$) and angle of side slip ($\beta$). With the five discrete pressure measurements available from this probe, angle of attack, angle of side slip, total pressure, static pressure and Mach number can be derived.

Mach number is the ratio of the speed of the aircraft to the speed of sound in the fluid medium and is a function, for the De Leo et al probe, of the average pressure of the off-axis ports divided by the total pressure. The relationship between the pressures and Mach number can be expressed as:

For subsonic speeds, $$P_T/P_S = (1 + 0.2 M^2)^{3.5} \tag{1}$$

For supersonic speeds, $$P_T/P_S = (1.2 M^2)^{3.5} [6/(7M^2 - 1)]^{2.5} \tag{2}$$

where M is Mach number, $P_T$ is total pressure and $P_S$ is static pressure. $P_S$ can be calculated when $P_T$ and M are known or it can be measured independently by static pressure ports.

While the scale factor and certainty of air flow angle detection of hemisphere probes like that of De Leo et al are superior in performance, the total pressure measurement varies with air flow angle approximately in proportion to a cosine squared function. It is preferable that the total pressure measurement be insensitive to angle of air flow to at least $+/-20$ degrees.

An alternative probe configuration utilizes the angle insensitive ogival total pressure source in conjunction with angle-of-attack sensing ports which are back on a second conical segment of the cylindrical afterbody. Probes of this type are disclosed in the De Leo et al Pat. Nos. 4,096,744 and 4,378,696. The characteristic of this differential pressure to angle of attack is much weaker at low angles and becomes non-linear at high angles of attack with a consequent loss of predictability.

The McCormack Pat. No. 4,718,273 discloses an air data sensor probe for providing measurements of total pressure, static pressure and angle-of-attack for an aircraft in flight. The probe is essentially cylindrical with a hemispherical nose. It has a vertically elongated central opening for measurement of total pressure and a plurality of off-axis openings, manifolded by pairs, to measure angle of attack. Static pressure is measured by a plurality of ports mounted back from the nose, manifolded together to provide the static pressure reading.

According to a paper entitled "Calibration of the Orbiter Air Data System for Space Shuttle Orbital Flight Testing" by Tymms and Hillje which was presented at the 1980 Air Data Systems Conference at the USAF Academy, the Space Shuttles have used a combination probe which provides measurements of total pressure, static pressure and upper and lower $\alpha$ pressure (for differential $\alpha$) from a data probe which is somewhat like those described hereinabove. It has a hemispherical nose containing a central opening for total pressure and a pair of upper and lower ports for $\alpha$, and a number of ports are located at a station aft on the cylindrical surface supporting the hemispherical nose. However, the total pressure port is sensitive to $\alpha$ (angle of attack) because it is a small diameter port on a much larger radius surface, thereby sensing the pressure distribution on the surface which varies as the angle of attack changes. Total pressure probes are often made with an opening almost equal to the nearby probe diameter so as to provide an $\alpha$-insensitive pressure measurement.

The probes used on the Space Shuttles also have a total temperature sensor mounted thereon. The total temperature and the total pressure openings of the probes used on the Shuttle are entirely independent of, and unrelated to, each other.

SUMMARY OF THE INVENTION

In brief, arrangements in accordance with the present invention comprise an integral, unitary air data probe capable of providing measurements of total pressure, differential α pressures, static pressure and total temperature. The α pressure and static pressure portions are mounted on a cylindrical barrel portion which terminates in a forward facing hemispherical nose portion. The static ports are located at a station aft on the cylindrical surface supporting the forward hemisphere. Two 60 pressure ports are mounted on the hemispherical nose portion of the probe, displaced above and below the central longitudinal axis. Total temperature and total pressure measurements are derived from a cavity which is located within the probe structure. This cavity has a relatively large, forward facing central opening which is designed to render both the total temperature and the total pressure measurements insensitive to angle of attack. Within the cavity which is provided for the measurement of total temperature and total pressure is a stagnation chamber. Air entering the central opening flows through the cavity and out an enlarged rear opening. The air flow from entrance to exit is guided by a curved duct, described hereinbelow, which is designed to maintain laminar flow throughout.

The total temperature measurement is used to determine the outside air temperature. Total temperature is related to the static temperature as a function of Mach number through the following equation:

$$T_T = T_S(1 + 0.2M^2) \tag{3}$$

where $T_T$ is total temperature, $T_S$ is static temperature, and M is the Mach number. Using static temperature, the velocity of sound can be determined from that and, with the Mach number measurement, true air speed can be ascertained.

The stagnation chamber within the cavity contains a resistive element connected in an electrical circuit associated with the aircraft instrumentation computer so that temperature can be measured. Both the total temperature and total pressure sensing portions of the probe are provided with through-flow passages for the automatic scavenging of collected water. This flow affects total pressure only to the extent of the pressure drop between the air inlet opening and the take-off of the Pitot conduit, and this is maintained negligibly low by the configuration of the cavity and air passages. The limited flow through the stagnation chamber containing the total temperature sensor results in only a small loss in recovery factor for total temperature measurements, and the flow is needed to minimize the thermal time constant of the temperature sensor's thermal capacity and also minimize conduction errors which result from heat flow through the element's mechanical support.

The measurement of total temperature in cold flows with entrained ice particles requires centrifugal removal of the particles prior to having the cold air flow contact the temperature sensing element. Centrifugal removal means a change in direction for the stream tube which the inertia of the particle cannot follow. Were the ice particles not removed, they would accumulate on stagnating surfaces of the temperature sensing element and soon disastrously alter the flow stream tubes about it. The exterior surfaces and forward facing edges of the probe body are heated, usually by electric elements, to melt impinging ice particles. The whole of the probe structure is at an uncharacteristic temperature but the temperature sensing element must still be immersed in the true cold air flow. This is done by arranging a probe through-flow in a smoothly contoured cavity duct having laminar flow. The duct must make a turn to cause ice particles to collide with warm walls, with the rate of turning being low enough to prevent flow separation. The middle of the duct carries the core flow, which is air that has not been heated by the duct walls and is free of ice particles. The total temperature and total pressure stagnation chamber is placed to intercept the core flow.

The duct cross-section is enlarged about the stagnation chamber in order to maintain the stream line cross-section constant, since there is little flow through the chamber. It is desirable to pass as much air as possible through the duct; the amount of ice particles intercepted by the total pressure duct opening is only a function of the opening area and is not influenced by restrictions downstream in the duct. The large amount of air provides additional insulating stream lines between the core air and the duct wall.

BRIEF DESCRIPTION OF THE DRAWINGS

A better understanding of the present invention may be realized from a consideration of the following detailed description, taken in conjunction with the accompanying drawing in which:

FIGS. 3A–3C are schematic views of another combination probe arrangement in accordance with the present invention, representing the front, plan section, and rear thereof, respectively;

FIGS. 5A–5C are schematic front, plan, and rear views, respectively, of the probe of FIG. 4;

DESCRIPTION OF THE PREFERRED EMBODIMENTS

Figure 1A:
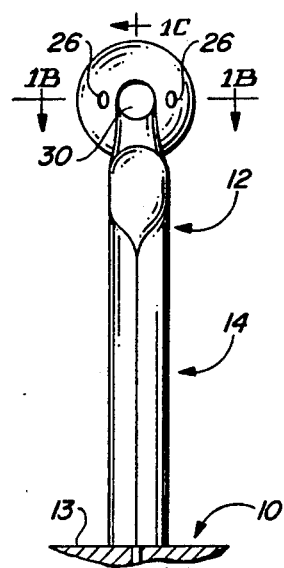
FIGS. 1A–1D are schematic orthogonal views, sole in section and partially broken away, of a combination probe in accordance with the present invention.
Figure 1D:
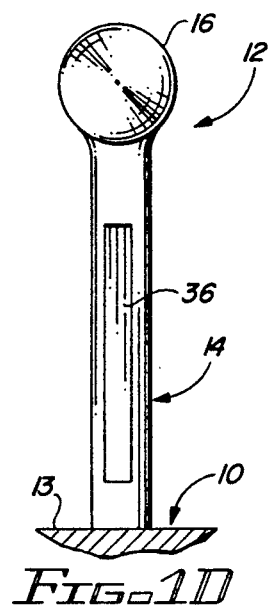
Figure 1B:
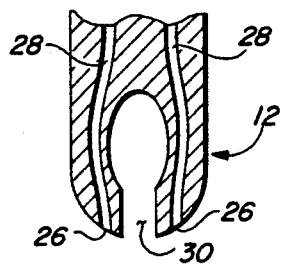
Figure 4:
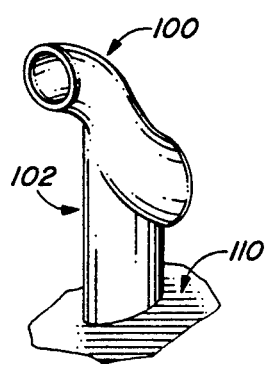
FIG. 4 is a schematic perspective view of yet another probe arrangement in accordance with the present invention.
Figure 6:
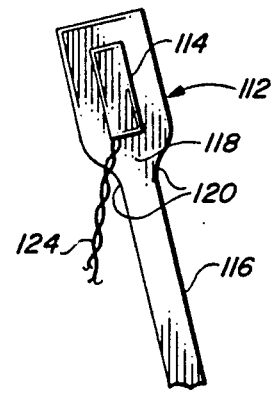
FIG. 6 is an enlarged schematic view of a portion of FIG. 5B.
Figure 1C:
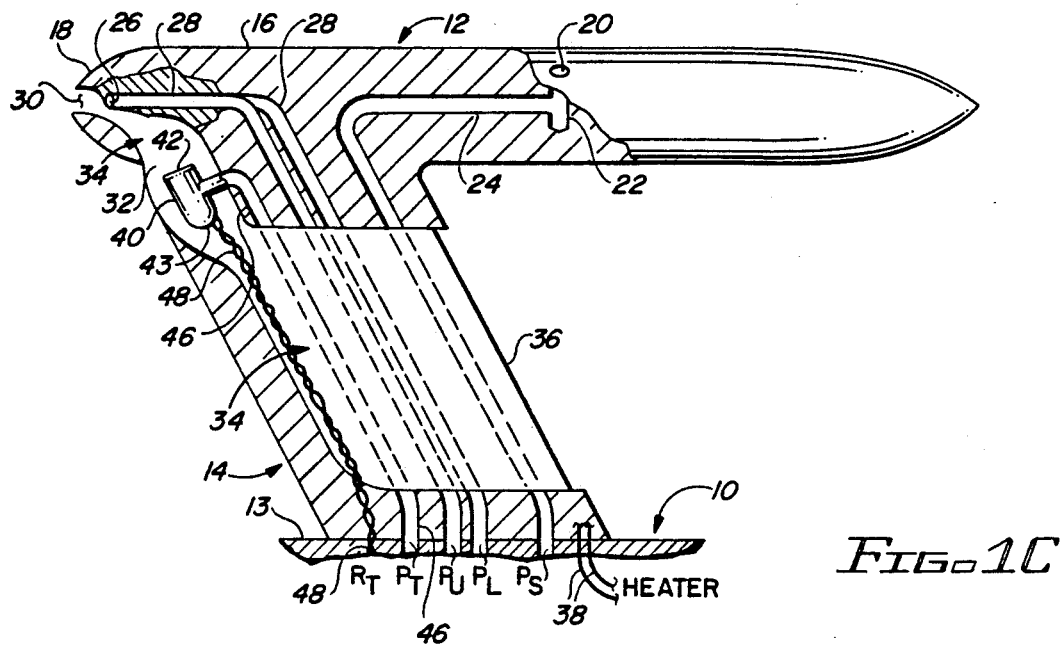

FIGS. 1A–1D are schematic orthogonal views of a probe 12 mounted to the side surface 13 of an aircraft fuselage 10. A single air data probe 12 is adequate; a pair of probes may be provided on opposite sides of the aircraft for redundancy and back-up. It will be understood that the probe 12 in FIG. 1A is shown rotated by 90° from its horizontal attitude when mounted on the aircraft 10. FIG 1B is a partial sectional view of the probe 12, taken along the line 1B—1B. FIG. 1C is a schematic sectional view, partially broken away, of the probe 12, taken along the line 1C—1C of FIG. 1A.

As depicted in these schematic views of the probe 12, it is shown consisting principally of a mounting strut 14 defining a cavity in which the total temperature and total pressure sensors are located, a generally cylindrical barrel portion 16 and a hemispherical nose portion 18. The barrel portion includes a plurality of opening 20 for sensing static pressure. These are located peripherally spaced about the barrel portion 16 at a constant axial position. The openings 20 are manifolded together by conduits 22 which lead to the center of the cylinder and join an axial conduit 24 which leads through the strut 14 for connecting to a pneumatic line within the aircraft.

The hemispherical nose portion 18 has a pair of opening 26, generally equally spaced above and below the horizontal central plane of the probe. As shown in FIGS. 1B and 1C, each opening 26 connects to a corresponding air passage 28 which leads back through the probe and strut to corresponding pneumatic lines within the aircraft. These pneumatic lines (not shown) carry the sensed pressures within the aircraft to appropriate sensors and a microprocessor for responding to the sensed pressures and controlling the appropriate instrument displays and other apparatus for which the pressure signals may be useful.

The openings 26 are responsive to $\alpha$ pressure—that is, pressure corresponding to angle of attack of the aircraft. As noted, the openings 20 are provided for measuring static pressure. Total pressure is measured from a stagnation chamber 40 installed within a cavity 32 in the strut 14, which also contains the sensor for measuring total temperature. Details of the structural arrangement for measuring total pressure and total temperature are particularly shown in FG. 2. The opening 30 is large by comparison with the other openings and communicates with an interior cavity 32. The cavity 32 is part of a duct 34 extending from the entrance opening 30 to an opening 36 at the aft edge of the strut 14 for the purpose of scavenging contaminants, principally water, which may tend to collect within the cavity. The walls of the duct 34 are smooth and gently curved to provide for centrifugal removal of entrained water/ice particles without disrupting the laminar flow of air through the passages of the duct 34.

Figure 2:
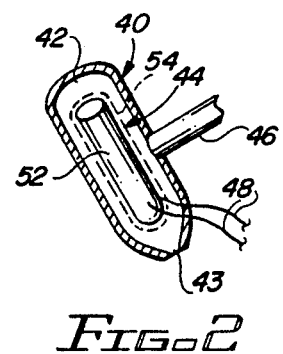
FIG. 2 is a schematic view, in section, of one particular element of the combination probe of FIG. 1C.

As is known in the art, the exterior surfaces and forward facing edges of the body of the probe 12 are heated, preferably by electric heating elements with circuitry indicated by the heater leads 38. This prevents ice buildup which would drastically alter the flow stream paths through the duct 34. Special provision is made, however, for isolating the total temperature and total pressure sensors from the effects of probe surface heating within the cavity 32. They are mounted away from the walls of the cavity in a stagnation chamber 40, better shown in the sectional view of FIG. 2. The chamber 40 has an entrance opening 42 and a small exit opening 43, and contains a resistor 44 which is used for measuring total temperature. The resistor 44 comprises an internal resistive element, preferably platinum wire of approximately 50 ohms, hermetically sealed within a conductive metal housing 52 and enveloped by a perforated metal, thermal radiation shield 54. Electrical leads 48 connect the resistor 44 to a temperature measurement circuit (not shown) within the aircraft 10.

An air passage 46 leads from the 40 through the strut 14 for connection to a to pneumatic line $P_T$ within the aircraft. The exit 43 of the chamber 40 permits limited flow of past the resistor 44, needed for accurate temperature readings, and also serves to scavenge any contaminants, such as water condensing within the chamber 40.

The static pressure within the chamber 40 is essentially a stagnation pressure (total or Pitot pressure) because of the relatively large area of the entrance opening 42 as compared with the exit opening 43. The pressure measurement which is provided by the conduit 46 is taken within the chamber 40 and is an accurate measurement of total pressure so long as there is no significant total pressure drop from the opening 30 to the tube 46 of the chamber 40 where the measurement is taken. Because of the location of the total pressure sensor opening 30 and the configuration of the chamber 40 within the cavity 32, the measurement of total pressure is essentially independent of angle of attack and angle of yaw, as well as side slip.

The combination probe 12 depicted in FIGS. 1A–1D and 2 provides two pressures for differential measurement from the forward facing hemispherical surface of the nose portion 18, provides static pressure from the ports 20 situated along the cylindrical portion 16 at a predetermined distance back of the hemispherical nose portion, and provides total temperature and total pressure from the chamber 40 located within the probe supporting strut, wherein the stagnation chamber is positioned within the duct extending from the forward facing enlarged opening 30 which is arranged to render both total temperature and total pressure insensitive to angle of attack.

FIGS. 3A–3C are respectively schematic front, plan and rear views of a side mounted combination probe which may be used as an alternative to the combination probe of FIGS 1A–1D. FIGS. 3A–3C show a probe 50 having a generally cylindrical body portion 52 with a hemispherical nose portion 54. Mounted in the nose portion 54, respectively above and below the central plane of the probe body 52, are a pair of openings 56. These connect to corresponding tubes 58 which extend longitudinally of the probe body 52 and then through the supporting strut 60 to provide for the sensing of $\alpha$ pressure; that is, the pressure corresponding to angle of attack of the aircraft.

Back along the body 52 of the probe 50 are a plurality of openings 62 for sensing static pressure. These are located peripherally spaced about the barrel portion 52 at a constant axial position. The openings 62 are manifolded together by conduits 64 which lead to the center of the probe body 52 and join an axial conduit 66 which leads through the strut 60 for connecting to a pneumatic line within the aircraft 10. Thus the openings 62 provide the means of measuring static pressure.

Total pressure and total temperature are measured in a stagnation chamber 70 containing a temperature sensing resistor 72 mounted within an air duct 74 at the rear end of the cylindrical probe body 22. The air duct 74 extends from a relatively large frontal opening 76 along a curved path to an exit opening 78. The stagnation chamber 70 with resistor 72 is much like the structural configuration shown in FIG. 2, except that the total pressure tube 80 is connected directly to the small exit opening 82 of the stagnation chamber 70. Air flow over the temperature sensing element is provided by small holes near the juncture of pressure tube 80 with chamber 70.

As with the structure of FIGS. 1A–1D, the duct 74 is shaped with smooth walls defining a gently curved path between inlet and outlet to develop the centrifugal separation of entrained water or ice particles from the core of the laminar flow which is directed to the entrance opening 84 of the stagnation chamber 70. Wires 86 are connected to the resistor 72 for connection to a temperature sensing circuit within the aircraft. Also as indicated with the initially described combination probe, the provision of heating elements for heating the exposed surfaces of the probe 50 are indicated by the heater wires 90. Operation and performance of the probe 50 of FIGS. 3A-3C are essentially like those of the alternative combination probe depicted in FIGS. 1A-1D.

A third embodiment of the combination probe in accordance with the invention is represented schematically in FIGS. 4, 5A-5C and 6. These figures show a combination total pressure, total temperature probe 100 mounted to the side of an aircraft 110 by means of a strut 102. As shown, the probe 100 is constructed much like the total pressure, total temperature portion of the probe 50 of FIGS. 3A-3C, comprising the duct and stagnation chamber therein. Probe 100 comprises a duct 104 extending between a frontal opening 106 and an exit opening 108. The duct 104 has smooth walls which are gently curved to maintain laminar flow for air flowing through the duct 104 while developing centrifugal force for separating entrained moisture/ice particles therefrom. A stagnation chamber 112 containing a resistor 114 is mounted at a position within the duct 104 to receive the core flow of air passing through the duct 104. The stagnation chamber 112 is much like the construction depicted in FIG. 2, except that the pressure tube 116 is conducted to the rear opening 118 of the chamber 112. A plurality of perforations 120 are shown adjacent the opening 118 in the wall of the pressure tube 116 to control the ex the exit area provided at the opening 118. Wires 124 couple the resistor 114 to temperature sensing circuitry within the aircraft. As before, the provision of heating elements for heating the strategic surfaces of the probe 100 is indicated by the heater wires 120.

In all three of the disclosed embodiments, the indicated total pressure and total temperature are both less than ideal because of the small flow allowed in the stagnation area. The measurements made in the stagnation chamber are chamber static pressure, indicative of free stream total pressure, and the chamber static temperature as :t bathes the resistance element, indicating free stream total temperature. The chamber can be said to have a Mach number, and if it were zero the measured parameters would be equal to desired stagnation values. The chamber Mach number is made low, by design of the flow-controlling exit restriction.

Figure 7:
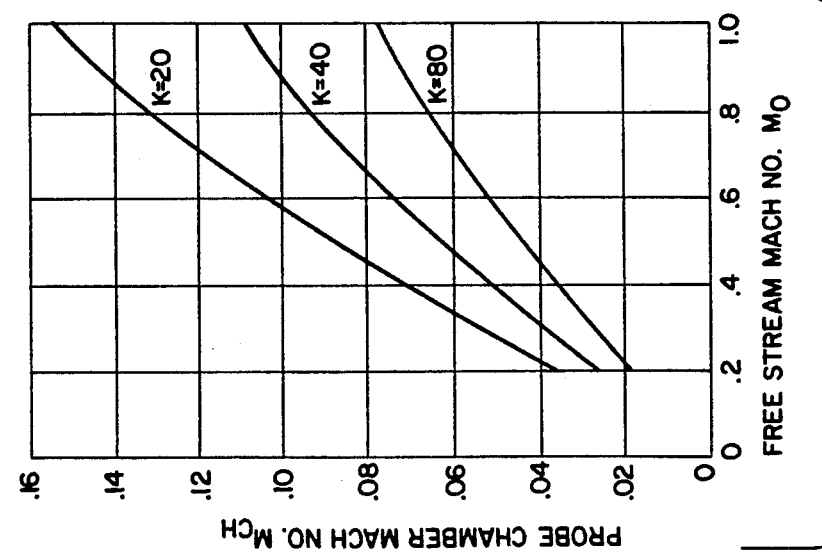
FIG. 7 is a graph of probe chamber Mach number as a function of free stream Mach number for three different probe designs.

The graph of FIG. 7 shows chamber Mach number as a function of free stream Mach number for three different probe designs (the design variable K being a function of the ratio of entrance area to exit area). For a fixed design, the chambers Mach number $M_{ch}$ is an increasing single-valued function of the aircraft (free stream) Mach number Mo, and that function is:

$$1 - KM_{ch}^2 = \left( \frac{1 + .2M_{ch}^2}{1 + .2M_o^2} \right)^{3.5} \quad (4)$$

The parameter K is determined by the following:

$$K = 0.7 f \, L/D (A_1/A_2)^2 \quad (5)$$

where
f is a friction factor,
L is the length and D is the diameter of the chamber,
$A_1$ is the area of the entrance and
$A_2$ is the area of the exit.

For f=0.04, L/D=1, and K as indicated in Table I, the listed ratios of $A_1/A_2$ and $D_1/D_2$ obtain:

TABLE I

| K | $A_1/A_2$ | $D_1/D_2$ |
|---|---|---|
| 20 | 26.7 | 5.2 |
| 40 | 37.8 | 6.1 |
| 80 | 53.5 | 7.3 | where $D_1$ is the diameter of the entrance and $D_2$ is the diameter of the exit.

A physical area ratio design has been shown to regulate the Mach number in the stagnation chamber. The simple equation used, Equation (4), is only appropriate for turbulent flow in the exit passage; at low aircraft Mach number that flow will be laminar and the chamber Mach number will be lower than the plot of FIG. 7 indicates. More accurate (and more complex) equations are available but use of this simple equation gives a feel of the design capability of regulating the chamber Mach number. The equation used is derived from the "Darcy equation" without corrections.

The chamber static pressure is led off to air data sensors and is represented as the total pressure. This pressure is slightly less than the free stream total and, after being ratioed with the free stream"static pressure, an aircraft Mach number is computed to be somewhat less than the free stream value. The static pressure is recovered along the cylindrical part of the combination probe. The equation which relates the three Mach numbers is:

$$1 + .2M_i^2 = \frac{1 + .2M_o^2}{1 + .2M_{ch}^2} \quad (6)$$

where $M_i$ is the indicated Mach number and $M_o$ and $M_{ch}$ are as defined in connection with Equation (4).

Figure 8:
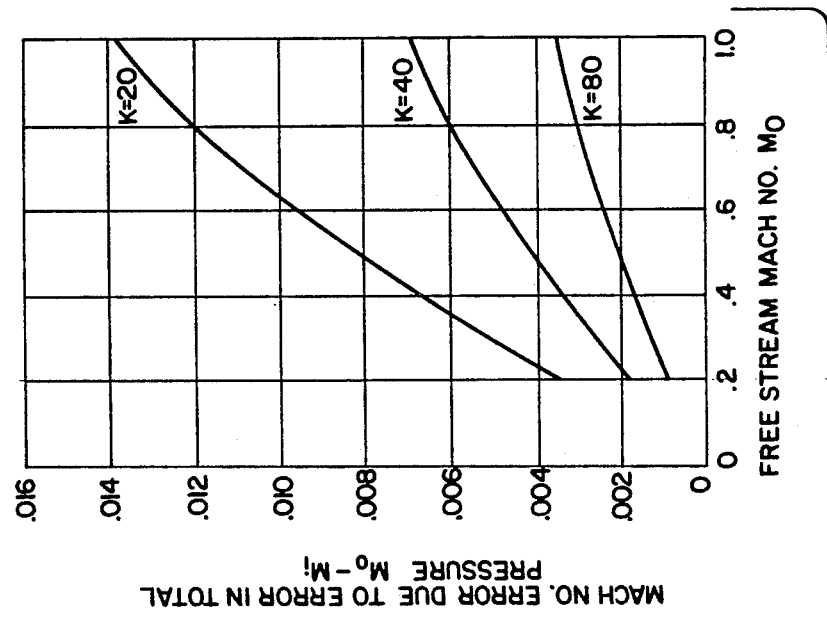
FIG. 8 is a graph showing Mach number error as a function of free stream Mach number for the same probe designs of FIG. 7.

The Mach number error, $M_o - M_i$, is plotted in the graph of FIG. 8 for three values of K and occurs because of error in the total pressure. The Mach number error will be less than indicated at low aircraft Mach number as the probe exit flow becomes laminar.

The temperature sensor in the chamber transmits a value to the air data computer which is slightly less than a completely stagnated value, and is related to $M_{ch}$ as $$T_{To} = T_i(1 + 0.2M_{ch}) \quad (7)$$

The equation relating free stream static temperature to total temperature is:

$$T_{To} = T_s(1 + 0.2M_o^2) \quad (8)$$

Combining the two relations gives:

$$T_{Ti} = T_s \left( \frac{1 + .2M_o^2}{1 + .2M_{ch}^2} \right) \quad (9)$$

The air data computer, having received an indicated total pressure and a static pressure to derive an indicated Mach number, operates on the received indicated total temperature information to produce an indicated static temperature calculation:

$$T_{S_i} = \left( \frac{T_{T_i}}{1 + .2M_i^2} \right) \quad (10)$$

Replacing $T_{T_i}$ and $(1+0.2M_o^2)$ with foregoing expressions (9) and (6), respectively, yields:

$$T_{S_i} = T_S \left( \frac{1 + .2M_o^2}{1 + .2M_{ch}^2} \right) \left( \frac{1 + .2M_{ch}^2}{1 + .2M_o^2} \right) = T_S \quad (11)$$

The calculated static temperature is error free because the total pressure-caused Mach number error corrects the error in stagnation temperature. The error cancellation occurs irrespective of the value of chamber Mach number and is only dependent on the use of the same chamber for both pressure and temperature measurement. Static temperature is used on an aircraft for density and sonic velocity determination and for setting turbine engine speed.

True airspeed error occurs because of the total pressure-caused Mach number error only, since the static temperature-sensitive sonic velocity is without error:

$$\Delta V_a = V_s \Delta M \quad (12)$$

Figure 9:
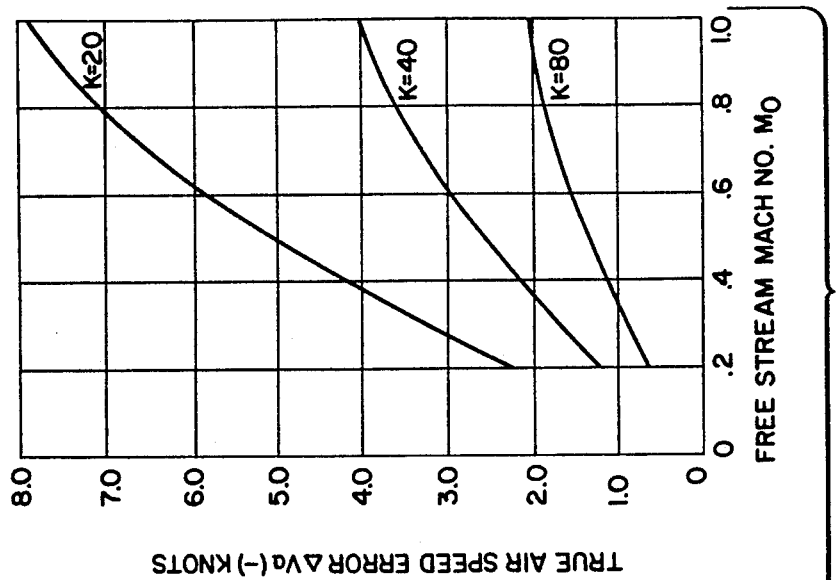
FIG. 9 is a graph showing true air speed error as a function of free stream Mach number for the same three probe designs.

FIG. 9 is a graph showing the true airspeed error for three different values of K, the chamber design constant. The following Table II lists altitudes and true airspeed values which are appropriate for the Mach number values along the X axis of FIG. 9.

TABLE II

| Typical Conditions | |
|---|---|
| Altitude | True Air Speed (Knots) |
| Sea Level | 132 |
| 10,000 feet | 255 |
| 20,000 feet | 369 |
| 30,000 feet | 471 |
| 40,000 feet | 574 |

It is generally desirable to have total pressure insensitive to aircraft angle of attack. It is further desirable to provide total temperature probes on the stagnation chamber having a large capture area. These desirable results are accomplished in a single unitary structure of the present invention by combining the stagnation chamber for the total temperature probe with the large total pressure probe opening. The resultant structure, which incorporates the alpha pressure and static pressure openings in a single probe configuration, provides significant advantageous results. Efficiencies of fabrication and installation are realized by the provision of a single probe of rugged construction, reduced drag in flight, and enhanced accuracy in operation, given the considerations discussed above.

Although there have been described above specific arrangements of a combination air data probe in accordance with the invention for the purpose of illustrating the manner in which the invention may be used to advantage, it will be appreciated that the invention is not limited thereto. Accordingly, any and all modifications, variations or equivalent arrangements which may occur to those skilled in the art should be considered to be within the scope of the invention as defined in the annexed claims.

What is claimed is:

1. A combination air data probe apparatus for installation on an aircraft comprising:
   a housing configured to extend outwardly from an exterior surface of the aircraft;
   means in said housing defining a relatively large forward-facing opening, and an interior cavity coupled to said opening;
   a duct for air flow extending from said opening to an exit opening downstream and including said cavity, said duct being configured to direct the air flow along a curved path for developing centrifugal force to separate entrained particles from core air flow while maintaining laminar flow along the duct;
   a stagnation chamber mounted within said cavity away from the sides of the duct in the region of core air flow, said chamber having upstream and downstream openings of different cross section, the upstream opening being substantially larger than the downstream opening, said chamber containing a resistor and attached circuit connections for providing air temperature measurements indicative of total temperature in said chamber; and
   a pneumatic conduit leading from said chamber for providing a pressure corresponding to total pressure at said chamber.

2. The apparatus of claim 1 wherein said forward-facing opening is circular and is positioned so as to be substantially insensitive to aircraft angle of attack.

3. The apparatus of claim 2 wherein said housing comprises a generally cylindrical probe body with a hemispherical nose containing said forward-facing opening, and a supporting strut for mounting the probe body to an aircraft fuselage.

4. The apparatus of claim 3 wherein the portion of said duct downstream from the stagnation chamber is contained within said strut, said exit opening being located along the aft edge of the strut.

5. The apparatus of claim 3 further including a pair of openings positioned in said nose portion respectively above and below said forward-facing opening, said pair of openings communicating individually with respective pneumatic tubes extending to said aircraft for providing pressures indicative of angle of attack.

6. The apparatus of claim 5 further including a plurality of openings distributed about the circumference of the probe body at a selected position aft of the nose portion, said openings being manifolded together to a common pneumatic passage leading to the aircraft fuselage.

7. The apparatus of claim 3 wherein said pneumatic conduit is connected to one side of said chamber approximately midway between said upstream and downstream openings.

8. The apparatus of claim 7 wherein said resistor is formed of platinum wire, hermetically sealed within a conductive metal housing and enveloped by a perforated xetal shield.

9. The apparatus of claim 1 wherein said housing comprises a generally cylindrical probe body extending forward of said duct and having a hemispherical nose defining a pair of tangential openings positioned respectively above and below a central horizontal plane of the probe body, said tangential openings communicating individually with respective pneumatic tubes leading to said aircraft for providing pressure measurements indicative of angle of attack.

10. The apparatus of claim 9 further including a plurality of openings distributed about the circumference of the probe body at a selected position aft of the nose portion, said openings being manifolded together to a common pneumatic passage leading to the aircraft fuselage.

11. The apparatus of claim 9 wherein said pneumatic conduit is connected to said chamber at the downstream opening thereof, said conduit providing a plurality of perforations adjacent said downstream opening.

12. The apparatus of claim 11 wherein said resistor is formed of platinum wire, hermetically sealed within a conductive metal housing and enveloped by a perforated metal shield.

13. The apparatus of claim 1 wherein said pneumatic conduit is connected directly to the downstream opening of the stagnation chamber.

14. The apparatus of claim 1 wherein said housing further includes a generally cylindrical portion extending forward along the outer periphery of the housing and terminating at its forward end in a hemispherical nose portion, said nose portion containing a plurality of openings symmetrically located off the central axis of the member for providing $\alpha$ pressures for measurement of angle of attack.

15. The apparatus of claim 14 wherein said cylindrical portion further includes a plurality of transversely directed openings located at a station aft of said nose portion for providing pressures for measuring static pressure.

16. The apparatus of claim 15 wherein said transversely directed openings are manifolded together by conduits interconnecting said openings to a common conduit extending through said housing for coupling to a pneumatic line within the aircraft.

17. The apparatus of claim 14 wherein said $\alpha$ pressure openings are each connected to individual conduits leading through said housing for coupling to corresponding pneumatic lines within the aircraft.

* * * * *